United States Patent [19]
Fergason et al.

[11] Patent Number: 4,789,858
[45] Date of Patent: Dec. 6, 1988

[54] MULTIFUNCTION SWITCH INCORPORATING NCAP LIQUID CRYSTAL

[75] Inventors: James L. Fergason, Atherton; Charles W. McLaughlin, Portola Valley, both of Calif.

[73] Assignee: Taliq Corporation, Sunnyvale, Calif.

[21] Appl. No.: 620,378

[22] Filed: Jun. 12, 1984

[51] Int. Cl.⁴ .............................................. G09G 3/36
[52] U.S. Cl. ................................. 340/784; 340/718; 340/365 VL; 350/351
[58] Field of Search ............... 340/789, 718, 365 R, 340/365 C, 365 A, 365 S, 712, 365 VL; 550/711, 712, 334; 368/226, 227, 240, 242

[56] References Cited

U.S. PATENT DOCUMENTS

| | | | |
|---|---|---|---|
| 3,578,844 | 5/1971 | Churchill | 350/351 |
| 4,015,422 | 4/1977 | Van Haagften | 340/815.2 |
| 4,017,848 | 4/1977 | Tannas, Jr. | 340/712 |
| 4,078,257 | 3/1978 | Bagley | 364/900 |
| 4,192,060 | 3/1980 | Washizuka et al. | 29/592 |
| 4,224,615 | 9/1980 | Penz | 340/765 |
| 4,363,029 | 12/1982 | Piliavin et al. | 340/712 |
| 4,435,047 | 3/1984 | Fergason | 350/334 |
| 4,468,659 | 8/1984 | Ohba et al. | 340/781 |
| 4,549,174 | 10/1985 | Funada et al. | 340/815.2 |
| 4,567,481 | 1/1986 | Meier et al. | 340/784 |

FOREIGN PATENT DOCUMENTS

3105981  2/1981  Fed. Rep. of Germany.

*Primary Examiner*—Marshall M. Curtis
*Attorney, Agent, or Firm*—Flehr, Hohbach, Test, Albritton, & Herbert

[57] ABSTRACT

A switch apparatus comprising a nematic curvilinearly aligned phases liquid crystal material located between a pair of electrode means wherein a flexible substrate having a conductive segment formed therein may be positioned in a spaced substantially parallel relation to one of the electrode means. The flexible substrate has sufficient flexibility to deflect toward one of the electrode means in response to the application of pressure thereto so that at least a portion of the flexible substrate is deflected toward one of the electrode means to operatively couple the conductive segment to the electrode means to effect an input of information and to cause a display of the same.

33 Claims, 4 Drawing Sheets

MULTIFUNCTION SWITCH INCORPORATING NCAP LIQUID CRYSTAL

The present invention relates generally to liquid crystal, and more particularly to a multifunction switch incorporating nematic curvilinearly aligned phases ("NCAP") liquid crystal.

Liquid crystals are used in a wide variety of devices, including visual display devices. The property of liquid crystals that enables them to be used, for example, in visual displays, is the ability of liquid crystals to transmit light on one hand, and to scatter light and/or to absorb it (especially when combined with an appropriate dye), on the other, depending on whether the liquid crystals are in a relatively free, that is de-energized or field-off state, or in a strictly aligned, that is energized or field-on state. An electric field selectively applied across the liquid crystals can be used to switch between the field-off and field-on states.

There are three categories of liquid crystal materials, namely, cholesteric, nematic and smectic. The present invention relates in the preferred embodiment described hereinafter to the use of liquid crystal material which is operationally nematic. By "operationally nematic" is meant that, in the absence of external fields, structural distortion of the liquid crystal is dominated by the orientation of the liquid crystal at its boundaries rather than by bulk effects, such as very strong twists (as in cholesteric material) or layering (as in smectic material). Thus, for example, a liquid crystal material including chiral ingredients which induce a tendency to twist but which cannot overcome the effects of the boundary alignment of the liquid crystal material would be considered to be operationally nematic. A more detailed explanation of operationally nematic liquid crystal material is provided in co-pending U.S. patent application Ser. No. 477,242, filed Mar. 21, 1983, in the name of Fergason, entitled ENCAPSULATED LIQUID CRYSTAL AND METHOD, assigned to Manchester R&D Partnership, the disclosure of which is hereby incorporated by reference. Reference may also be made to U.S. Pat. No. 4,435,047, issued Mar. 6, 1984, in the name of Fergason, entitled ENCAPSULATED LIQUID CRYSTAL AND METHOD, assigned to Manchester R&D Partnership, which disclosure is also hereby incorporated by reference.

It is to be understood, however, that the various principles of the present invention may be employed with any of the various types of liquid crystal materials or combinations thereof, including combinations with dyes. Reference to NCAP liquid crystal apparatus or NCAP liquid crystal in connection with the present invention is in no way intended to limit the present invention to use with nematic liquid crystal materials. It is only for convenience sake and in an effort to use an abbreviated term that describes the switch apparatus of the present invention that reference is made to NCAP liquid crystal. Particularly, the term NCAP is used because the preferred liquid crystal material is nematic or operationally nematic liquid crystal and because in the field-off condition, or any other condition which results in the liquid crystal being in a distorted or randomly aligned state, the liquid crystal structure is distorted to a curved form (hence curvilinearly aligned) wherein the spatial average orientation of the liquid crystal material over a capsule-like volume, for instance, is strongly curved and there is no substantial parallel directional orientation of the liquid crystal in the absence of a prescribed input, for example, an electric field.

NCAP liquid crystals and a method of making the same and devices using NCAP liquid crystals are described in detail in the above-identified U.S. Pat. No. 4,435,047. Briefly, NCAP liquid crystal comprises a liquid crystal material dispersed in an encapsulating medium. A NCAP liquid crystal apparatus is an apparatus formed of NCAP liquid crystal material that is capable of providing a function of the type typically inuring to a liquid crystal material. For example, such a NCAP liquid crystal apparatus may be a visual display device that responds to the application and removal of an electric field to effect a selected attenuation of visible light.

Such NCAP liquid crystal apparatus may commonly include a NCAP liquid crystal material positioned between two electrodes wherein the electrodes are located on respective substrates. Such apparatus may be used in electronic devices that include a keyboard or push buttons or an array of push buttons, or other types of electrical switches and contacts used to control and/or input information into an electronic device. Such an electronic device may include any number of function keys such as OFF and ON, START and STOP, TEST and NO-TEST, etc. It will be appreciated that as the complexity of an electronic device increases, the number of functions which the device can accomplish, and hence the number of function keys or push buttons, also increases. Due to space limitations and for other considerations, it would be advantageous to limit the number of function keys and associated displays for a particular electronic device. One way of doing this is to integrate a function key into an apparatus which displays the function.

The NCAP liquid crystal is particularly suitable for use as part of a switch or function key for inputting and displaying information. A membrane-type switch having a flexible faceplate may be integrated with an NCAP liquid crystal display apparatus wherein the information is displayed by the NCAP apparatus with such display being visible through the flexible faceplate of the switch. Depression of the faceplate by application of a pressure thereto, as might be applied by an operator, inputs information and causes a change in the display. The quality of the display of the present invention is not adversely affected by application of a pressure to the faceplate. In fact, the high quality of the display of the present invention is unchanged by the application of such a pressure.

With prior art liquid crystal display devices, it was not possible to build a truly effective display apparatus that includes a membrane-type switch for inputting or receiving information. The reason for this is that depression of a flexible faceplate of such a switch, beneath which may be located a liquid crystal material, would cause a flow of the liquid crystal material away from the location at which pressure is applied, adversely affecting the quality of the display.

Particularly, such a flow of liquid crystal produces a change in the electrical and optical properties of the liquid crystal, for example, a change in polarization and the occurrence of birefringence, which adversely affects the appearance of the display. For instance, the application of a pressure to a prior art liquid crystal display device utilizing a twisted nematic-type liquid crystal material would cause such material to lose its 90° twist, producing a detrimental optical effect and thereby degrading the quality of the display. Additionally, when such pressure is removed, the liquid crystal material flows back to its original position, producing another detrimental optical effect.

Unlike prior art liquid crystal displays, the NCAP liquid crystal which forms a part of the switch apparatus of the present invention is insensitive to pressure; thus, there is no detrimental effect to the display of such an apparatus upon the application of pressure thereto. Particularly, by providing for confinement of discrete quantities of liquid crystal material, for example, in capsules, permits each individual capsule or capsule-like volume to in effect operate as an independent liquid crystal device with the result that the display effected by the switch apparatus of the present invention is not pressure sensitive. That is to say, the encapsulated liquid crystal material will not flow away from the point at which pressure is applied thereto to any significant extent to adversely affect the quality of the display.

In view of the foregoing, an object of the present invention is to provide a multifunction key or switch incorporating NCAP liquid crystal wherein an effective display is provided.

Another object of the present invention is to provide a multifunction key or switch including a NCAP liquid crystal which is insensitive to pressure wherein the switch is adapted to input and display information such that the information display may be dependent upon the function or operation controlled.

As may be seen hereinafter, the switch apparatus of the present invention includes a switch means for inputting information and for displaying the same. The switch means incorporates NCAP liquid crystal material. NCAP liquid crystal material comprises a liquid crystal material and containment means for inducing a generally non-parallel alignment of said liquid crystal material which in response to such alignment at least one of scatters and absorbs light and which in response to a prescribed input reduces the amount of such scattering or absorption.

The prescribed input is preferably of the electromagnetic type and, more particularly, an electric field. A pair of electrodes may be provided to apply the electric field. The electrodes are located on opposite sides of the combination of the liquid crystal material and the containment means. The electrodes may be adapted to effect a visual output display of information.

The switch means may comprise a flexible substrate having a conductive segment formed thereon. The flexible substrate may be positioned in a spaced substantially parallel relationship to one of the electrodes of the NCAP apparatus. The flexible substrate has sufficient flexibility to deflect toward the electrode in response to the application of a pressure thereto. At least a portion of the flexible substrate is deflectable toward the electrode means so that the conductive segment thereon is coupled to the electrode means to effect the visual output display.

The switch apparatus of the present invention will be described in more detail hereinafter in conjunction with the drawings wherein.

Figures 1, 2, 3:
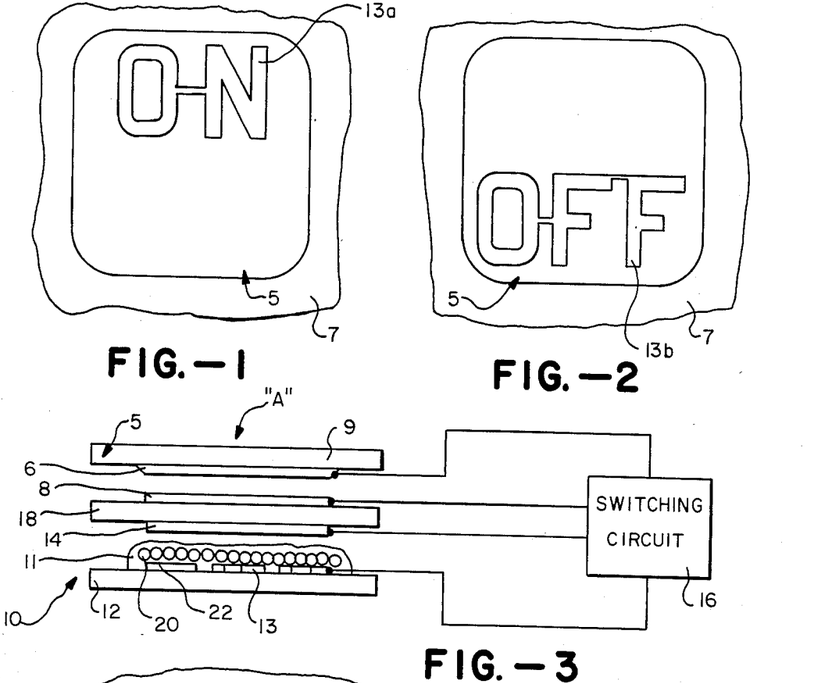
FIGS. 1-3 are schematic views illustrating a multifunction switch in accordance with the present invention.

Referring now to the drawings, in which like components are designated by like reference numerals throughout the various figures, attention is first directed to FIGS. 1 and 2. FIGS. 1 and 2 show a key or push button 5 that is adapted to control the on/off function of an electronic device 7. Of course, it should be apparent that the present invention may be used to control and display almost any function of a device, such as START/STOP, HIGH/LOW, FORWARD/REVERSE, etc. Additionally, it should be apparent that the present invention may be utilized with many different types of devices, for example, calculating equipment, communication equipment, household appliances such as microwave ovens, computer-aided design equipment, and computer-aided manufacturing equipment.

FIG. 1 depicts the device in the on mode wherein the word "ON" is displayed. FIG. 2 shows the device in the off mode with the word "OFF" displayed. Key or push button 5 is a membrane-type switch. It includes a flexible front substrate 9 that is adapted to deflect toward a second substrate 18 when pressure is applied thereto, as schematically illustrated by arrow "A". Preferably, substrate 9 is a polyester film having sufficient flexibility to deflect under a pressure as might be applied by an operator of a typical keyboard.

Substrate 9 has an electrode or conductor 6 formed thereon that is adapted to contact an electrode 8 located on substrate 18. Particularly, when an operator applies pressure by depressing substrate 9 (as shown by arrow "A"), the gap between substrates 9 and 18 will close, and electrode 6 will electrically contact electrode 8, operating the function that switch 5 controls. Alternatively, switch 5 may operate on the basis of a change in capacitance between conductors 6 and 8 as would occur when substrate 9 is depressed. In such an embodiment, there would be no need to have conductors 6 and 8 contact one another.

The present invention further includes a NCAP liquid crystal apparatus, indicated generally by reference numeral 10. The apparatus includes a NCAP liquid crystal material 11 which may be supported on a substrate 12 having an electrode 13 located thereon. The apparatus further comprises a second electrode 14 mounted on the side of substrate 18 remote from electrode 8. Membrane switch 5 and NCAP apparatus 10 thus in effect share a common substrate or electrode. As illustrated, conductive segment 6 is positioned in a spaced substantially parallel position relative to electrode 14. The NCAP liquid crystal material 11 may include a liquid crystal material 20 more or less contained within the confines or the interior volume of a capsule 22 or encapsulating medium. The NCAP liquid crystal material comprises a plurality of such capsules or an encapsulating medium in which liquid crystal material is dispersed.

A quantity of liquid crystal material is confined or contained in volumes within the encapsulating medium, for example, in a solid medium as individual capsules or dried stable emulsions. Such volumes may be discrete volumes, that is, once formed, they ordinarily remain as individually distinct entities or separate entities. Such separate entities or discrete volumes, however, may also be interconnected, for example, by one or more passages. The liquid crystal material would preferably be in both the discrete volumes and in such interconnecting passages. Thus, the internal volumes of respective capsules may be fluidly coupled via one or more interconnecting passages. All of the aspects and features of the present invention vis-a-vis individual unconnected capsules have been found to be applicable to an arrangement of capsules that have one or more interconnecting passages.

In the embodiment illustrated, electrode 13 comprises two electrically isolated patterns of conductors 13a and 13b (see FIGS. 1 and 2), each of which may be selectively energized. Conductor 13a may be configured to display the word "ON" when it is energized, and conductor 13b the word "OFF" when it is in an energized state. Electrode 14 preferably has a rectangular shape that approximates the outline of the pattern of electrode 13.

Figure 4:
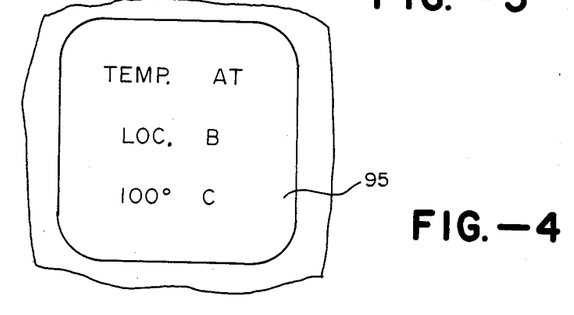
FIG. 4 is a schematic view of an alternate embodiment of the present invention utilizing a dot matrix configuration to display information.

Of course, it should be understood that electrode 13 may comprise some other pattern of conductors, for example, conductor 13 may comprise a plurality of 5×7 dot matrix characters wherein individual conductive segments of the matrix may be selectively energized, as is known in the art, to display either the words "ON" or "OFF". For that matter, such a dot matrix arrangement may be driven to display any other alpha or numeric display desired, including a display of more than two functions or a display of other information. For example, as shown in FIG. 4, a membrane-type push button 95 may be depressed to provide a temperature reading at a certain location ("Loc. B") wherein the temperature is a variable parameter. In the embodiment of FIG. 4, a plurality of dot matrix characters are used to provide the displayed information, which includes the temperature and its location within the process. In this respect, it is also possible to drive the dot matrix arrangement of FIG. 4 such that the temperature at another location may be displayed by push button 95. Other possible configurations and operations of push button 95 and its associated dot matrix characters are possible in the context of the present invention.

The embodiment shown in FIGS. 1-3 does however offer the advantage of reducing the complexity of the circuitry required to control and drive the display, since such circuitry need only selectively apply a voltage across one or the other of the two conductors 13a and 13b in response to the operation of switch 5.

A voltage may be selectively applied to electrodes 13 and 14, and hence across liquid crystal material 11, by means of a switching circuit 16 (see FIG. 3). Circuits that accomplish the functions of switching circuit 16 are well known to those skilled in the art, and thus switching circuit 16 is not described in any detail. As shown, appropriate electrical leads connect the switching circuit to electrode 14, conductive segments 13a and 13b, and electrodes 6 and 8 of switch 5. Switch 5 controls the on and off functions of device 7 through switching circuit 16. Device 7 is switched between its on and off modes by depressing substrate 9 of switch 5. Switching circuit 16 also controls the application of a voltage across electrode 14 and either conductive segment 13a or 13b, depending upon the mode (on or off) of device 7.

By way of example, if device 7 is in the off mode, conductor 13b will be energized, that is, a voltage will be applied across electrode 14 and segment 13b, and hence across the NCAP liquid crystal material located therebetween, such that the molecules of the NCAP liquid crystal are in the desired alignment to permit the transmission of light to display the word "OFF". Conversely, no voltage is applied across segment 13a, and thus it is in a de-energized or field-off state wherein the liquid crystal material scatters and/or absorbs light to obscure the word "ON". Pressing key or push button 5 to turn device 7 on causes electrode 13a to be energized and electrode 13b to be de-energized such that the word "ON" is displayed and the word "OFF" is obscured.

Substrates 9, 12 and 18, and electrodes 6, 8, 13, and 14 may be optically transmissive so that liquid crystal apparatus 10 is capable of controlling the transmission of light therethrough in response to an electric field applied across electrodes 13 and 14. Alternatively, electrode 13 and/or substrate 12 may be optically reflective or may have thereon an optically reflective coating so that reflection by such reflective coating of incident light will be a function of whether there is an electric field applied across the liquid crystal 11.

A plurality of NCAP liquid crystals arranged in one or more layers are preferably applied to substrate 12 in a manner such that the NCAP liquid crystals adhere to electrode 13 and substrate 12. The material of which capsules 22 are formed is suitable for binding or otherwise adhering the capsules to the substrate and the electrode. In one embodiment, capsules 22 are formed of a polyvinyl alcohol (PVA). In the preferred embodiment, the liquid crystal material is dispersed or entrapped in a latex medium. In either embodiment, substrate 12 may be a flexible polyester film, such as Mylar ®, that has been precoated with a 90 to 5000 ohms per square, and preferably 450±15 ohms per square, layer of indium tin oxide (ITO). The electrode coated surface of substrate 12 is etched, as is well known in the art, to form conductive segments 13a and 13b. Of course, materials other than ITO may be used to form electrode 13. A Mylar ® film with a precoated ITO electrode, known as Intrex, may be used in the present invention. Intrex may be purchased from Sierracin of Sylmar, Calif.

As noted, latex entrapped NCAP liquid crystal is used in the preferred embodiment. Latex entrapped NCAP liquid crystal comprises the entrapment of liquid crystal in a latex medium. The latex is a suspension of particles. The particles may be natural rubber or synthetic polymers or copolymers. A latex medium is formed by drying a suspension of such particles. A further explanation of latex entrapped NCAP liquid crystal and methods of making the same are provided in U.S. patent application Ser. No. 705,209 filed Feb. 25, 1985, in the name of Pearlman, entitled LATEX ENTRAPPED NCAP LIQUID CRYSTAL COMPOSITION, METHOD AND APPARATUS, assigned to the assignee of the present invention, and which disclosure is hereby incorporated by reference.

Briefly, latex entrapped NCAP liquid crystal may be formed by mixing a suspension of latex particles and liquid crystal material wherein the liquid crystal material has been previously emulsified in an aqueous phase. Alternatively, all components may be combined prior to emulsifying the liquid crystal material. The mixture may then be applied to substrate 12 and electrode 13. As the mixture dries, it adheres to the electrode coated side of the polyester film. When dried, the latex particles form a latex medium with particles of liquid crystal dispersed in therein.

A specific method for making latex entrapped NCAP liquid crystal may comprise first emulsifying 36 grams of the liquid crystal ROTN701 (manufactured by Hoffman La Roche of New York, N.Y.) in a solution containing 14 grams of a 12% aqueous solution of PVA and 1 gram of the surfactant TWEEN 20 (available through ICI Americas Incorporated of Wilmington, Del.). The liquid crystal is added continuously while the solution is mixed with an impeller blade at 3500 RPM. When the particle size of the liquid crystal is about 1-5 microns, 49 grams of Neorez R-967 (manufactured by Polyvinyl Chemical Industries, Wilmington, Mass.), containing 40% latex particles by weight, is added with slow mixing of less than 1000 RPM until the mixture is homogenous. This material may then be cast with a doctor blade or other suitable means onto substrate 12 and electrode 13.

After the NCAP liquid crystal material has dried on electrode 13 and substrate 12, substrate 18 and electrode 14 formed thereon may be laminated onto the surface of the latex entrapped NCAP liquid crystal. Substrate 18 may also be a flexible Mylar ® film precoated with a 90 to 5000 ohms per square, preferably a 450±150 ohms per square, layer of ITO to form electrode 14. Electrode 14 and substrate 18 are substantially optically transparent to electromagnetic radiation in at least a portion of the visible range. Electrode 14 and Mylar ® film 18 may be formed from the Intrex material.

Electrode 8 on the side of substrate 18 remote from electrode 14 may be formed by depositing an optically transmissive conductor material, such as ITO, on the surface of substrate 18. As noted, substrate 9 may be a polyester film having sufficient flexibility to deflect toward substrate 18 when push button 5 is depressed so that electrode 6 on substrate 9 conductively contacts conductor 8. Conductor 6 is preferably formed from an optically transmissive conductor material such as ITO, and substrate 9 is also transparent.

Figure 5:
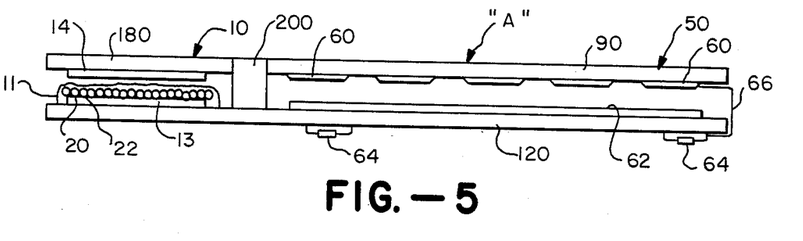
FIG. 5 is a schematic view of another embodiment of the present invention.

FIG. 5 illustrates an alternate embodiment of the present invention. In this embodiment, NCAP liquid crystal apparatus 10 and a membrane-type switch 50 share a back or common substrate 120. As discussed heretofore, NCAP apparatus includes a NCAP liquid crystal material 11 supported on substrate 120 having an electrode 13 located thereon. The NCAP apparatus also includes a second electrode 14 mounted on a substrate 180.

Electrode 13 may be configured to form a pattern of electrically isolated conductive segments (including a dot matrix or other similar pattern) for effecting any desired display, such as a numerical display. Electrode 14 may have a rectangular shape that approximates the outline of electrode 13.

As discussed hereinabove, substrates 120 and 180, or portions thereof forming a display or viewing area, and electrodes 13 and 14 may be optically transmissive so that the NCAP liquid crystal apparatus is capable of controlling the transmission of light therethrough in response to an electrical field applied across electrodes 13 and 14. Alternatively, electrode 14 and substrate 180, or a portion thereof through which the display is to be viewed, may be transparent, and electrode 13 and/or mounting substrate 120, or a portion thereof in a display area, may be optically reflective or have an optically reflective coating thereon. Preferably, substrates 120 and 180 are formed from a flexible polyester film. These substrates and the electrodes formed thereon may be fashioned from the Intrex material referred to above.

In the embodiment of FIG. 5, membrane-type switch 50 is spaced from and horizontally disposed with respect to NCAP apparatus 10. Switch 50 includes a flexible front substrate 90 that is adapted to deflect toward substrate 120 when pressure is applied thereto, as by a human operator and as schematically illustrated by arrow "A". Substrate 90 is preferably a polyester film having such sufficient flexibility. As illustrated, substrate 90 is substantially parallel to and spaced from substrate 120. Front substrate 90 has an electrical conductor 60 located thereon that is adapted to contact an electrical conductor 62 located on rear substrate 120. Particularly, when an operator presses key or push button 50, substrate 90 is deflected towards substrate 120 such that the gap therebetween closes with conductor 60 contacting conductor 62 to actuate the function that switch 50 controls.

Appropriate circuitry for operatively coupling switch 50 to NCAP apparatus 10 and for driving the display may be included on substrate 120. Such circuitry may include LSI metal oxide semiconductor (MOS) chips 64 mounted in a single dual-in-line package suitable for direct assembly to substrate 120. Appropriate circuit paths would be provided for interconnecting the display electrodes of NCAP apparatus 10 and the conductors of switch 50 to the chips 64. Such conductive paths may be formed on and/or through substrate 120, as is well known in the art, and a conductive flexible tape 66, such as Scotchlink Connector Tape manufactured by the Elctro/IEP Division of the 3M Company, Inc. of St. Paul, Minn., may be utilized to connect conductors 60 in circuit with chips 64. All the timing, logic, memory, resistors, switch functions, and drivers for the display and switch may be contained in chips 64.

A spacer 200 may be provided between NCAP apparatus 10 and switch 50 to separate substrates 90 and 180. Alternatively, the spacer may be eliminated, and substrates 90 and 180 would comprise a single flexible substrate.

The embodiment of FIG. 5 may also be modified by locating a dielectric material between substrate 90 and substrate 120. The dielectric material would form an insulative barrier between conductors 60 and 62. Application of pressure to flexible front substrate 90 (as shown by arrow "A"), however, would cause the dielectric material to be displaced from between conductors 60 and 62 so that electrical contact could be made therebetween. The embodiment of FIGS. 1-3 could be similarly modified by locating a dielectric material between conductors 6 and 8.

Figure 6A:
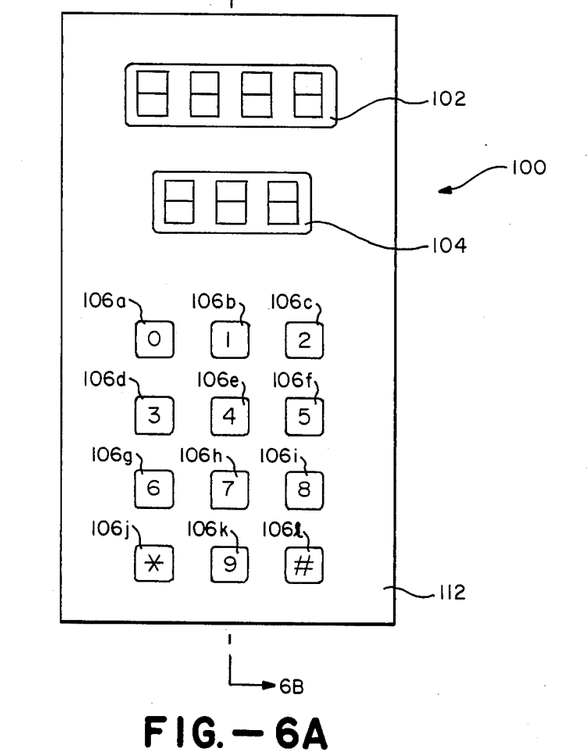
FIG. 6A schematically illustrates an integrated control panel in accordance with the present invention.
Figure 6B:
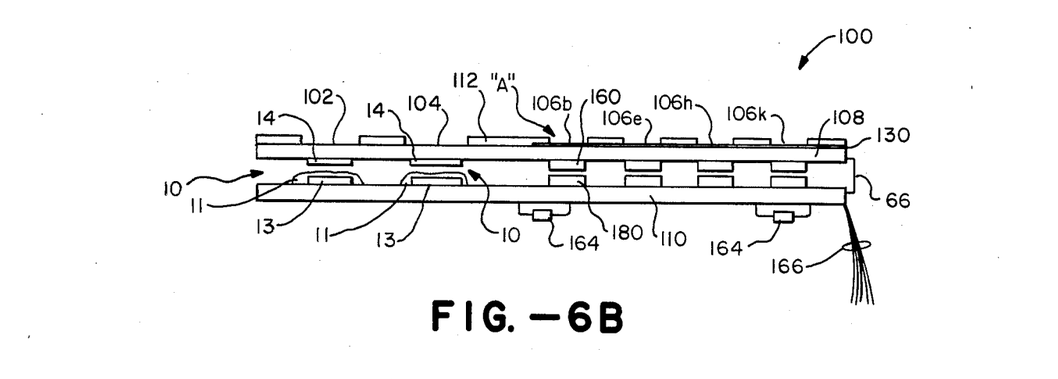
FIG. 6B is a view along line 6B—6B of FIG. 6A.

The embodiment of FIG. 5 provides for the integration of the display, the switch, and the circuitry for driving and controlling the display and switch functions in a single unit. Such a unit may be utilized as an integrated control panel for various devices such as household appliances. For instance, as shown in FIGS. 6A and 6B, an integrated control panel 100 may be utilized as a control panel for a microwave oven.

Such a control panel 100 can comprise two displays 102 and 104, and any desired number of keys or switches, for example switches 106a–106l, for inputting information to control the operation of a microwave oven, for instance. The displays may be the numerical display shown that is effected by a pair of NCAP apparatus 10 located between substrates 108 and 110 (see FIG. 6B). The control panel may further include a frontface 112 which includes appropriate openings for the displays and switches. The switches would preferably be membrane-type switches wherein at least a portion of substrate 108 corresponding to a particular switch area would be sufficiently flexible to effect an input of information. For instance, switch 106b may comprise conductors 160 and 180 formed on respective substrates 108 and 110 wherein the area of substrate 108 corresponding to switch 106b is sufficiently flexible such that with the application of a pressure thereto (represented by arrow "A") conductor 160 contacts conductor 180 to effect a selected input of information. Alternatively, as discussed heretofore, the switch may function by a change in the effective capacitance between conductors 160 and 180.

A printed overlay 130 (see FIG. 6B) may be located over the respective switch areas 106a–106l to identify the function controlled and/or the information to be inputted. As shown, by way of example, switch 106a is overlaid with the numeral "0". As discussed heretofore, the necessary control circuitry for driving the displays and for effecting an input of information by means of the switches would be provided by chips 164 on substrate 110. A flexible conductive tape 66 may be used to interconnect the conductors and display electrodes on substrate 108 in circuit with the circuitry on substrate 110. Appropriate circuit paths would be formed on and/or through the respective substrates.

Electrical leads 166 may be used to interconnect the control panel circuitry to the circuitry of the microwave oven, for instance, with which the control panel is to be utilized. In this manner, an integrated control panel may be constructed and subsequently assembled into the microwave oven by simply connecting leads 166 to the appropriate circuitry in the oven. Such an integrated control panel would be particularly useful in assembling high volume, low cost products.

Figure 7:
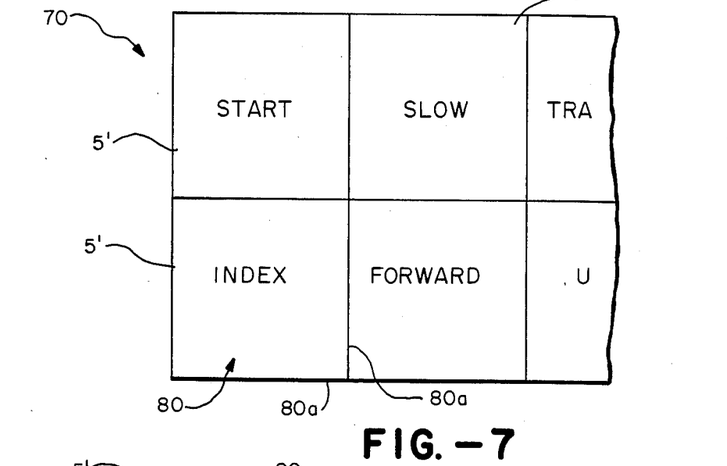
FIG. 7 schematically illustrates an array of switches in accordance with the present invention utilized to form a keyboard.

An array of switches constructed in accordance with the present invention may be used to construct a keyboard as illustrated in FIG. 7. The keyboard 70 may comprise a plurality of switches or keys 5' arranged adjacent to one another in columns and rows. Each switch 5' may be adapted to display an associated function that it controls. A computer, such as a microprocessor 90 on a printed circuit board (PCB) 92 (see FIG. 8), may be utilized in conjunction with the switches to control their associated functions. The computer may also be used to implement control over the selective application of the electrical field across the liquid crystal material of each switch.

Figure 8:
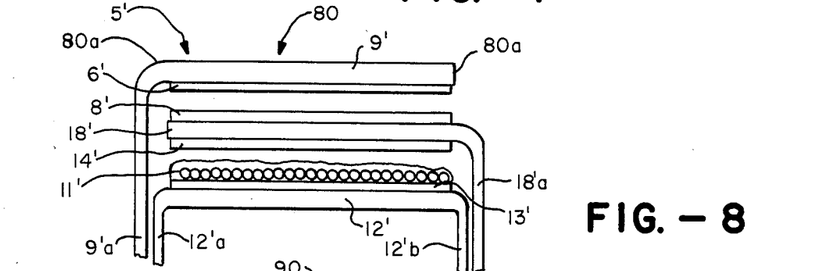
FIG. 8 is an end view of one of the switches of FIG. 7.

Switches 5' of keyboard 70 may be direct-addressed. The conductive paths which connect the electrodes of the respective switches to a suitable circuit means, for example one located on PCB 92, for driving the displays and for effecting an input of information by means of a switch may be formed on flexible arms or extensions, as shown in FIG. 8. Particularly, substrate 12' on which electrode 13' is formed may include flexible extensions 12a' and 12b' on which are formed an appropriate number of conductive paths for connecting electrode 13' to a circuit means. For example, if electrode 13' was formed to comprise a plurality of dot matrix characters wherein individual conductive segments of the matrix can be selectively energized and are direct driven to effect the desired display, the numerous conductive paths required for interconnecting the conductive segments to the circuit means would be formed on flexible arms 12a' and 12b'. Similarly, substrate 18' may include a flexible extension 18a' having suitable conductive paths formed thereon for connecting electrodes 8' and 14' to the circuit means. Substrate 9' may also include a flexible arm 9a' having a conductive path formed thereon for connecting electrode 6' to a suitable circuit means. The respective flexible extensions may be sharply bent as shown to permit interconnection of the electrodes on the substrates to the circuit means.

Substrates 12' and 18' and their associated extensions 12a' and 18a' may be formed from the Intrex material. The conductive paths on the extensions may thus be formed by etching the ITO coated surfaces thereof. The conductive path on extension 9a' of substrate 9' may be formed by depositing a conductor material, such as ITO, on the surface thereof.

The use of the flexible extensions as described above permits the respective switch apparatus 5' of keyboard 70 to be located in close proximity to one another such that the distance between switches is minimized. Additionally, the flexible extensions provide a maximum viewing or display area 80 for each switch, as the electrodes 13' and 14' which effect the visual output display may extend to the outer perimeter 80a of viewing area 80.

Figure 9:
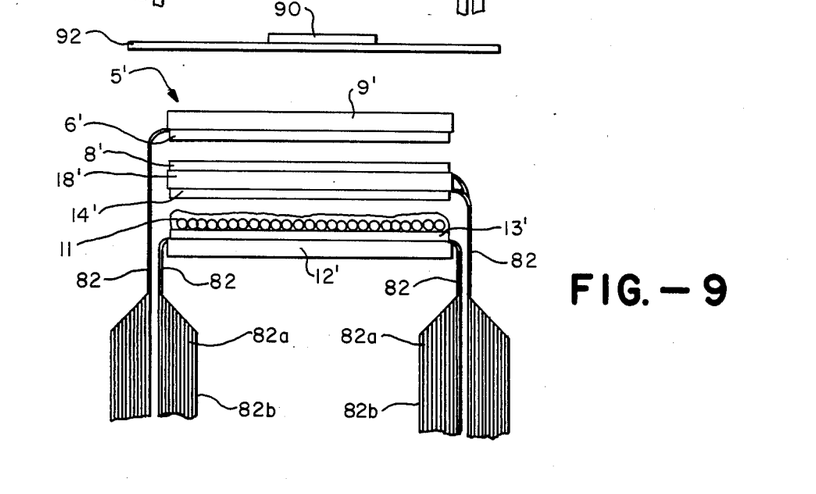
FIG. 9 schematically illustrates yet another embodiment of the present invention.

Another embodiment of the present invention is shown in FIG. 9. In this embodiment, the flexible extensions or arms heretofore described are replaced by a flexible conductive tape 82. The conductive tape electrically connects the electrodes on the various substrates to a circuit means for driving the display and for inputting information via the switches. The conductive tape may be an electrically-conductive, flexible tape such as Scotchlink Connector Tape manufactured by the Electro/IEP Division of the 3M Company, Inc. of St. Paul, Minn. this type of connector tape may comprise a plurality of conductor stripes 82a formed on a film backing 82b. Of course, where the tape is utilized to interconnect a single electrode to a circuit means, the conductive tape need only include one conductor stripe. The connector tape further includes an adhesive material for electrically connecting the conductor stripes to the respective electrodes as well as to a suitable circuit means. Such connections may be accomplished by means of heat bonding.

An integrated multifunction keyboard may be constructed in accordance with the present invention. Such a keyboard (see FIGS. 10A and 10B) may include a plurality of integrated multifunction function switches 200. This keyboard is particularly suitable for use as a menu for computer-accessed information. For instance, the keyboard may be used to access the entertainment activities available in a given area. By way of example, depressing the key 200 displaying the term "MOVIES" would cause a display on the keyboard of all of the movies in the particular area. The display of such movies would be provided by the display electrode pattern of switches 200. Further depressing a switch 200 displaying a certain movie may cause a display of additional information, visible through the faceplates of some or all of switches 200, relating to the movie selected, such as the location or locations and times at which the particular movie is playing.

Such pyramiding of information may be accomplished by means of a suitable microprocessor and software for operating the same. The display of information would be effected by the display electrode pattern of the various multifunction switches, the display being visible through the faceplates of the switches. The surface of the display would be extremely flat and preferably multiplexing techniques would be utilized to drive the various displays.

Figure 10A:
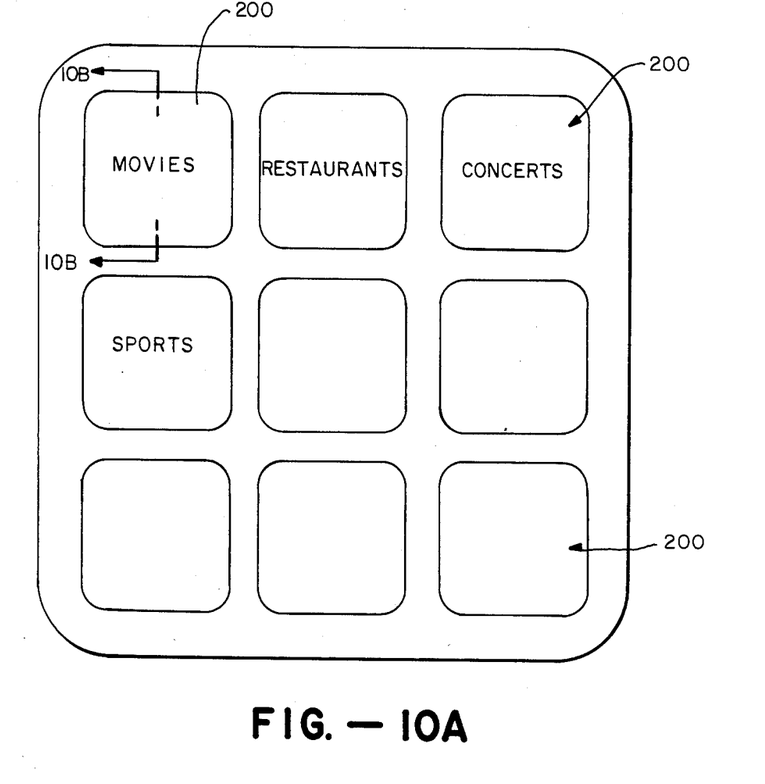
FIG. 10A schematically illustrates an integrated multifunction keyboard in accordance with the present invention.
Figure 10B:
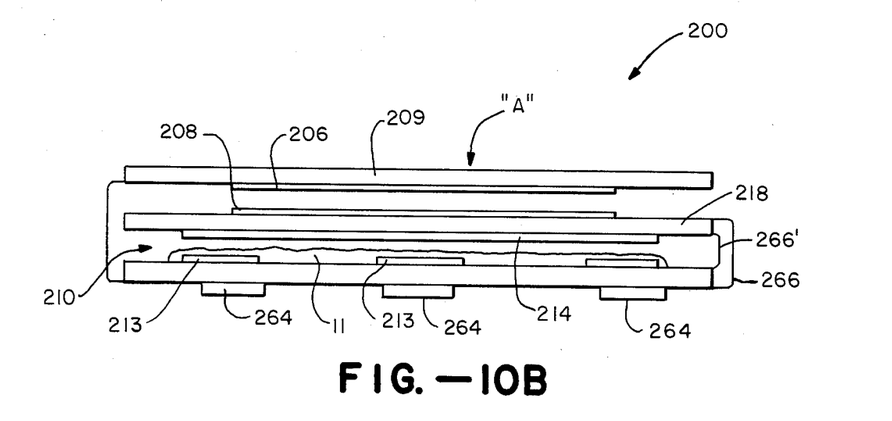
FIG. 10B is a view along line 10B—10B of FIG. 10A.

FIG. 10B illustrate a suggested construction for a switch 200 of the keyboard. The construction of switch 200 is similar to that illustrated in FIGS. 1–3. Switch 200 may comprise a flexible faceplate or substrate 209 that is adapted to deflect toward a substrate 218 when pressure is applied to substrate 209, as schematically illustrated by arrow "A". Faceplate 209 includes a conductor 206 that is designed to contact conductor 208 on substrate 218 when an operator depresses faceplate 209, thereby effecting an input of information by means of the switch. Alternatively, switch 200 may operate on the basis of a change in capacitance between conductors 206 and 208, eliminating the necessity of having conductor 206 contact conductor 208.

Key 200 would further include an NCAP liquid crystal apparatus 210 for displaying information, which may be observed through faceplate 209. As heretofore described, the NCAP apparatus would include an NCAP liquid crystal material 11 located on a substrate 212 having an electrode 213 formed thereon. A further electrode 214 may be located on substrate 218 on the side thereof remote from conductor 208.

Electrode 213 preferably comprises a dot matrix pattern of conductive segments wherein individual conductive segments may be selectively energized to display the requested information. Electrode 214 may comprise a similar pattern of conductive segments or a single common electrode, as illustrated.

Chips 264, as discussed previously, may be located on the backside of substrate 212. The chips provide the necessary timing, logic, memory, and switch functions for driving the display in response to the input of information by means of the switches. Appropriate circuit patterns may be formed on and/or through substrates 209, 212 and 218, and flexible conductive tape 266 may be utilized to connect the respective conductors 206 and 208, and display electrodes 213 and 214 in circuit with chips 264.

In the context of the present invention, it would be possible to construct a keyboard of the type shown in FIG. 10A by utilizing a single faceplate for the plurality of switches, and one pair of substrates for all of the NCAP display apparatus. Such displays would simply be formed between selected portions of the substrates, and similarly, selected portions of the faceplate would have sufficient flexibility to permit proper operation of the switches.

Although certain specific embodiments of the invention have been described herein in detail, the invention is not to e limited only to such embodiments, but rather only by the appended claims.

What is claimed is:

1. A switch apparatus comprising a switch means having a flexible portion for inputting information and for causing a display, said switch means incorporating a liquid crystal apparatus including the combination of a liquid crystal material and containment means for inducing a distorted alignment of said liquid crystal material which in response to such alignment at least one of scatters and absorbs light and which in response to a prescribed input reduces the amount of such scattering or absorption, the combination of the liquid crystal material and containment means being supported by a flexible substrate in spaced substantially parallel relation to said flexible portion, wherein a change in the display is effected by application of said prescribed input by deflection of said flexible portion with at least a part of said flexible substrate also being deflected, the combination of the liquid crystal material and containment means substantially resistant to flow away from the area of deflection of said part of said flexible substrate such that the capability of said liquid crystal apparatus to induce said distorted alignment and to reduce the amount of such scattering or absorption remains substantially unaffected by the deflection.

2. The switch apparatus of claim 1 comprising an array of said switch means.

3. The switch apparatus of claims 1 or 2 further including electrode means for applying an electric field as said prescribed input and connection means for connecting said electrode means to a circuit means for energizing said electrode means to apply said electric field wherein said connection means allows a maximum area for the display of information.

4. The switch apparatus of claim 3 wherein said electrode means is supported by said flexible substrate and said connection means comprises a flexible extension of said flexible substrate having sufficient flexibility for interconnection of said electrode means to said circuit means.

5. The switch apparatus of claim 3 wherein said connection means comprises a flexible conductive tape.

6. The switch apparatus of claim 1 wherein said flexible portion comprises a second flexible substrate having sufficient flexibility so that at least a portion of said second flexible substrate is deflectable in response to the application of a pressure thereto to input information and to effect a display of the same.

7. The switch apparatus of claim 6 wherein one of said flexible substrates includes a flexible extension thereof for electrical interconnection to a circuit means 8. The switch apparatus of claim 6 including a flexible conductive tape for electrically interconnecting one of said flexible substrates to a circuit means.

9. A switch, comprising:
   a first flexible substrate having a first electrode means formed thereon and having sufficient flexibility to deflect in response to the application of a pressure thereto to actuate a switch function and to cause a display visible therethrough;
   a liquid crystal means including the combination of a liquid crystal material and containment means for inducing a distorted alignment of said liquid crystal material which in response to such alignment at least one of scatters and absorbs light and which in response to an electric field reduces the amount of such scattering or absorption;
   second electrode means located on a second substrate spaced from and substantially parallel to said first flexible substrate wherein said liquid crystal means is located between said first and second electrode means and supported by at least one of said substrates; and at least a portion of said first flexible substrate deflectable toward said second electrode means in response to the application of said pressure to actuate said switch function and to cause a display, at least part of said pressure applied to said liquid crystal means during deflection of said first flexible substrate and said liquid crystal means substantially resistant to flow away from the point of application of said pressure such that the capability of said liquid crystal means to induce said distorted alignment and to reduce the amount of such scattering or absorption remains substantially unaffected by the application of said pressure.

10. The switch apparatus of claim 9 further including connection means for connecting said electrode means to a circuit means wherein said connection means allows for a maximum area for said display.

11. The switch apparatus of claim 10 wherein said connection means comprises a flexible conductive tape.

12. The switch apparatus of claim 10 wherein said connection means includes a flexible extension of at least one of said substrates and said flexible extension has sufficient flexibility to facilitate interconnection of said electrode means to said circuit means.

13. An array of switches of claim 9 utilized to form a keyboard.

14. A switch, comprising:
- a flexible substrate having a conductive segment formed thereon and having sufficient flexibility to deflect in response to the application of a pressure thereto to input information and to cause a display;
- a liquid crystal apparatus including the combination of a liquid crystal material and containment means for inducing a distorted alignment of said liquid crystal material which in response to such alignment at least one of scatters and absorbs light and which in response to an electric field reduces the amount of such scattering or absorption;
- a pair of electrode means for applying said electric field wherein the combination of said liquid crystal material and said containment means is located between said electrode means, at least one of said electrode means positioned adjacent to but spaced from said conductive segment and said electrode means adapted to effect a visual output display;
- substrate means in spaced substantially parallel relation to said flexible substrate for supporting the combination of said liquid crystal material and said containment means, and said electrode means; and
- at least a portion of said flexible substrate being deflectable in response to the application of said pressure to input information and to cause said visual output display, and at least a portion of said pressure applied to the combination of the liquid crystal material and containment means and said combination substantially resistant to flow away from the point of application of said pressure such that the capability of said liquid crystal apparatus to induce said distorted alignment and to reduce the amount of such scattering or absorption remains substantially unaffected by the application of said pressure.

15. A switch apparatus, comprising:
- a flexible substrate having a conductive segment formed thereon and having sufficient flexibility to deflect in response to the application of a pressure thereto;
- a liquid crystal apparatus including the combination of a liquid crystal material and containment means for inducing a distorted alignment of said liquid crystal material which in response to such alignment at least one of scatters and absorbs light and which in response to an electric field reduces the amount of such scattering or absorption;
- first and second substrate means between which the combination of said liquid crystal material and said containment means is disposed, at least one of said substrate means being flexible;
- first electrode means on said first substrate means for applying said electric field;
- second electrode means on said second substrate means on the side of the combination of said liquid crystal material and said containment means remote from said first electrode means and positioned in a spaced substantially parallel relation to said conductive segment, said first and second electrode means adapted to apply said electric field to effect a visual output display; and
- at least a portion of said flexible substrate being deflectable in response to the application of said pressure to input information and to cause said visual output display, and at least a portion of said pressure applied to the combination of the liquid crystal material and containment means and said combination being substantially resistant to flow away from the point of application of said pressure during deflection of said flexible substrate such that the capability of said liquid crystal apparatus to induce said distorted alignment and to reduce the amount of such scattering or absorption remains unaffected by the application of said pressure.

16. A switch comprising:
- a first flexible substrate means having a conductive segment formed thereon and having sufficient flexibility to deflect in response to the application of a pressure thereto;
- a liquid crystal means including the combination of a liquid crystal material and containment means for inducing a distorted alignment of said liquid crystal material which in response to such alignment at least one of scatters and absorbs light and which in response to an electric field reduces the amount of such scattering or absorption;
- a second flexible substrate means for supporting the combination of said liquid crystal material and said containment means;
- first electrode means located on said second flexible substrate means;
- second electrode means on a third flexible substrate means on the side of the combination of said liquid crystal material and said containment means remote from said second flexible substrate means, said first and second electrode means adapted to apply said electric field to effect a visual output display visible through said first flexible substrate means;
- third electrode means on said third flexible substrate means on the side thereof remote from said second electrode means, said third electrode means positioned in a spaced substantially parallel relation to said conductive segment; and
- at least a portion of said first flexible substrate means being deflectable toward said third electrode means in response to the application of said pressure so that said conductive segment is brought into contact with said third electrode means to effect an input of information and to apply said electric field to cause said visual output display, at least a portion of said pressure applied to the combination of the liquid crystal material and containment means and said combination substantially resistant to flow away from the point of application of said pressure such that the capability of said liquid crystal apparatus to induce said distorted alignment and to reduce the amount of such scattering or absorption remains unaffected by the application of said pressure.

17. The switch of claim 16 wherein at least one of said flexible substrate means include flexible extensions to facilitate interconnection of said conductive segment and electrode means to a circuit means for energizing said first and second electrode means to apply said electric field and for controlling the input of information.

18. The switch of claim 16 further including a flexible conductive tape for interconnecting said conductive segment and said electrode means to a circuit means for energizing said first and second electrode means to apply said electric field and for controlling the input of information.

19. An array of switches of claim 16, 17 or 18 forming a keyboard.

20. A switch apparatus, comprising:
  a first flexible substrate having a first conductive segment formed thereon;
  a second conductive segment positioned beneath and in a spaced substantially parallel relation to said first conductive segment, and first flexible substrate having sufficient flexibility to deflect toward said second conductive segment in response to the application of pressure thereto;
  a liquid crystal means including the combination of a liquid crystal material and containment means for inducing a distorted alignment of said liquid crystal material which in response to such alignment at least one of scatters and absorbs light and which in response to an electric field reduces the amount of such scattering or absorption, the combination of said liquid crystal material and said containment means spaced from and horizontally disposed with respect to said first and second conductive segments;
  a pair of electrode means for applying said electric field wherein the combination of said liquid crystal material and said containment means is located between said electrode means, said electrode means adapted to effect a display of information;
  a second substrate for supporting said second conductive segment, at least one of said electrode means and said liquid crystal means; and
  at least a portion of said first flexible substrate being deflectable toward said second conductive segment in response to the application of said pressure to effect an input of information and to cause a display, deflection of said first flexible substrate applying pressure to said liquid crystal means and the capability of said liquid crystal means to induce said distorted alignment and to reduce the amount of such scattering or absorption remaining unaffected by the application of said pressure.

21. The switch apparatus of claim 20 wherein said first flexible substrate and at least one of said electrode means are substantially optically transparent for viewing of said display.

22. The switch apparatus of claim 21 further including a spacer located between said first and second conductive segments, and said electrode means.

23. A switch apparatus, comprising:
  a first substrate having sufficient flexibility to deflect in response to the application of a pressure thereto;
  a first conductive segment formed on said first substrate;
  a second conductive segment formed on a second substrate, said second conductive segment being positioned beneath and in a spaced substantially parallel relation to said first conductive segment;
  a liquid crystal apparatus including the combination of a liquid crystal material and containment means for inducing a distorted alignment of said liquid crystal material which in response to such alignment at least one of scatters and absorbs light and which in response to an electric field reduces the amount of such scattering or absorption;
  first electrode means on said first substrate for applying said electric field, said first electrode means spaced from and horizontally disposed with respect to said first conductive segment;
  second electrode means located on said second substrate and spaced from and horizontally disposed with respect to said second conductive segment wherein said second substrate is located on the side of the combination of said liquid crystal material and said containment means remote from said first substrate, said first and second electrode means adapted to apply said electric field to effect a visual output display and the combination of the liquid crystal material and containment means located therebetween; and
  at least a portion of said first substrate being deflectable toward said second substrate in response to the application of said pressure so that said first conductive segment may be brought into contact with said second conductive segment to effect an input of information and to cause said visual output display, deflection of said first substrate applying pressure to the combination of the liquid crystal material and containment means wherein the capability of said liquid crystal apparatus to induce said distorted alignment and to reduce the amount of such scattering or absorption remains substantially unaffected by the application of said pressure.

24. An apparatus, comprising:
  at least one display for displaying information wherein said display includes a liquid crystal apparatus including the combination of a liquid crystal material and containment means for inducing a distorted alignment of said liquid crystal material which in response to such alignment at least one of scatters and absorbs light and which in response to a prescribed input reduces the amount of such scattering or absorption, the information displayed being effected by a selective application of said prescribed input;
  a substrate means having at least a portion thereof sufficiently flexible to deflect in response to the application of a pressure thereto;
  a switch means operable by the application of pressure to said flexible portion of said substrate means to cause the same to deflect in response thereto to input information and cause a display; and
  at least a portion of said pressure applied to the combination of the liquid crystal material and containment means during deflection of said flexible portion of said substrate means, the capability of said liquid crystal apparatus to induce said distorted alignment and to reduce the amount of such scattering or absorption remaining substantially unaffected by the application of said pressure thereto.

25. The apparatus of claim 24 utilized as an integrated control panel in household appliances.

26. A keyboard, comprising:
a plurality of switch means for inputting information wherein each of said switch means includes a flexible substrate having sufficient flexibility so that at least a portion of said substrate is deflectable in response to the application of a pressure thereto to actuate a switch function;
a display associated with said switch means for displaying information wherein said display includes a liquid crystal means including the combination of a liquid crystal material and containment means for inducing a distorted alignment of said liquid crystal material which in response to such alignment at least one of scatters and absorbs light and which in response to a prescribed input reduces the amount of such scattering or absorption, the information displayed being effected by application of said prescribed input by deflection of a substrate of said switch means by the application of a pressure thereto; and
at least a portion of said pressure applied to said liquid crystal means during deflection of said substrate, said liquid crystal means substantially unaffected by the application of said pressure such that said liquid crystal means retains its ability to induce said distorted alignment and to reduce the amount of such scattering or absorption during deflection of said substrate.

27. The keyboard of claim 26 wherein a computer means is utilized for controlling the function of said switch means.

28. A plurality of the switch apparatus of claim 1 forming a keyboard.

29. A switch comprising:
a transparent substrate having sufficient flexibility to deflect in response to the application of a pressure thereto to actuate a switch function and to cause a display visible through said substrate;
a liquid crystal means located rearwardly of said substrate and including the combination of a liquid crystal material and containment means for inducing a distorted alignment of said liquid crystal material which in response to such alignment at least one of scatters and absorbs light and which in response to a prescribed input reduces the amount of such scattering or absorption;
at least a portion of said substrate deflectable toward the rear of the switch in response to the application of said pressure for actuating said switch function and causing a display; and
at least a part of said pressure applied to said liquid crystal means during deflection of said substrate, said liquid crystal means substantially unaffected by the application of said pressure in that it retains its ability to induce said distorted alignment and to reduce the amount of such scattering or absorption.

30. A switch comprising:
a first flexible substrate having a first conductor formed thereon and having sufficient flexibility to deflect in response to the application of pressure thereto to actuate a switch function and to cause a display visible through said first substrate;
a liquid crystal means including the combination of a liquid crystal material and containment means for inducing a distorted alignment of said liquid crystal material which in response to such alignment at least one of scatters and absorbs light and which in response to an electric field reduces the amount of such scattering or absorption;
a second substrate rearwardly of said first substrate and spaced from and substantially parallel thereto, said second substrate having a second conductor located thereon wherein said liquid crystal means is located between said first and second conductors;
at least a portion of said first substrate deflectable toward said second substrate in response to the application of said pressure to cause a change in said display and actuate said switch function; and
at least a portion of said pressure applied to said liquid crystal means during deflection of said first substrate, said liquid crystal means substantially unaffected by the application of said pressure such that it retains its ability to induce said distorted alignment and to reduce the amount of such scattering or absorption during the application of said pressure.

31. The invention of claims 24 or 26 further including control means connected in circuit with said switch means and said display for controlling the application of said prescribed input.

32. A switch comprising:
a display means for causing a display including,
(i) a liquid crystal means including the combination of a liquid crystal material and containment means for inducing a distorted alignment of said liquid crystal material which in response to such alignment at least one of scatters and absorbs light and which in response to an electrical input reduces the amount of such scattering or absorption, and
(ii) a substrate means for supporting said liquid crystal means;
a switch means including a substrate that is deflectable by application of a pressure thereto to actuate said switch means;
a circuit means for detecting actuation of said switch means and for providing the electrical input to said liquid crystal means;
at least a portion of said pressure applied to said liquid crystal means during application of said pressure that actuates said switch means, said liquid crystal means substantially unaffected by the application of said pressure in that it retains its ability to induce said distorted alignment and to reduce the amount of such scattering or absorption; and
wherein actuation of said switch means causes said display to change at the point of application of said pressure by causing an electrical input to be provided to said liquid crystal means.

33. A switch comprising:
a display means for causing a display including,
(i) a liquid crystal means including the combination of a liquid crystal material and containment means for inducing a distorted alignment of said liquid crystal material which in response to such alignment at least one of scatters and absorbs light and which in response to an electrical input reduces the amount of such scattering or absorption, and (ii) a substrate means for supporting said liquid crystal means;

a switch means disposed in front of and adjacent to said display means, said switch means including a substantially transparent substrate that is deflectable toward said display means by application of a pressure thereto to actuate said switch means;

a circuit means for detecting actuation of said switch means and for providing the electrical input to said liquid crystal means;

at least a part of said display means capable of bearing the stress associated with the application of said pressure and said liquid crystal means substantially unaffected by the application of said pressure in that it retains its ability to induce said distorted alignment and to reduce the amount of such scattering or absorption during the application of said pressure; and wherein actuation of said switch means by deflection of said substrate thereof causes said display to change at the point of application of said pressure by causing an electrical input to be provided to said liquid crystal means.

* * * * *